United States Patent [19]

Stein

[11] 4,082,020
[45] Apr. 4, 1978

[54] TOOL-CLAMPING DEVICE AND METHOD OF SETTING UP A PIPE CUTOFF MACHINE

[75] Inventor: Merle R. Stein, Duquesne, Pa.

[73] Assignee: United States Steel Corporation, Pittsburgh, Pa.

[21] Appl. No.: 761,180

[22] Filed: Jan. 21, 1977

[51] Int. Cl.² .................. B23B 29/00; B23B 3/00; B23B 1/00; B23B 3/04
[52] U.S. Cl. .................................... 82/37; 82/1 R; 82/25; 82/47; 82/101
[58] Field of Search .................. 82/37, 25, 36 R, 56, 82/98, 101, 47

[56] References Cited

U.S. PATENT DOCUMENTS

| 788,206 | 4/1905 | Grant | 82/37 |
|---|---|---|---|
| 808,647 | 1/1906 | Fields | 82/37 |
| 902,652 | 11/1908 | Greenleaf et al. | 82/37 |
| 971,556 | 10/1910 | Peterson | 82/37 |
| 3,130,618 | 4/1964 | Drantz | 82/37 |
| 3,656,219 | 4/1972 | Connelly | 82/101 |

FOREIGN PATENT DOCUMENTS 152,468  10/1920  United Kingdom ............... 82/101

Primary Examiner—Harrison L. Hinson
Attorney, Agent, or Firm—Walter P. Wood

[57] ABSTRACT

A tool-clamping device especially for a pipe cutoff machine, and a method of setting up a pipe cutoff machine. The clamping device includes a base and an overlying cap between which the tool is clamped. Spring means within the base and cap urge the cap to a tool-releasing position. Hydraulic means within the base pull the cap to a tool-clamping position against the action of the spring means. In setting up the machine, a tool is lightly clamped in the device, moved into contact with a pipe chucked in the machine to adjust the overhang, and firmly clamped for cutting.

7 Claims, 4 Drawing Figures

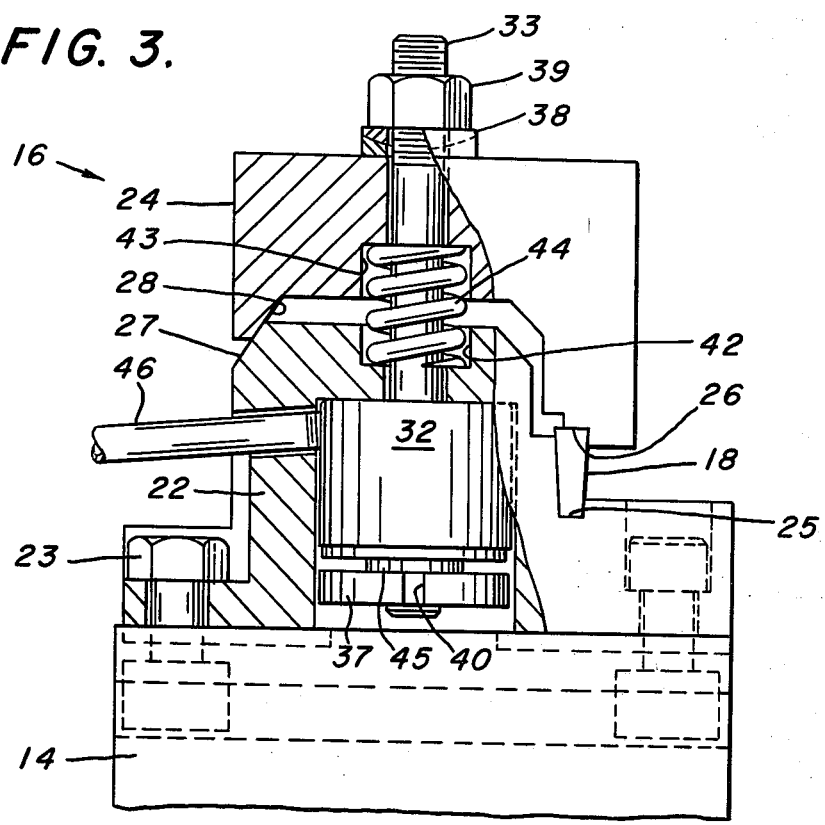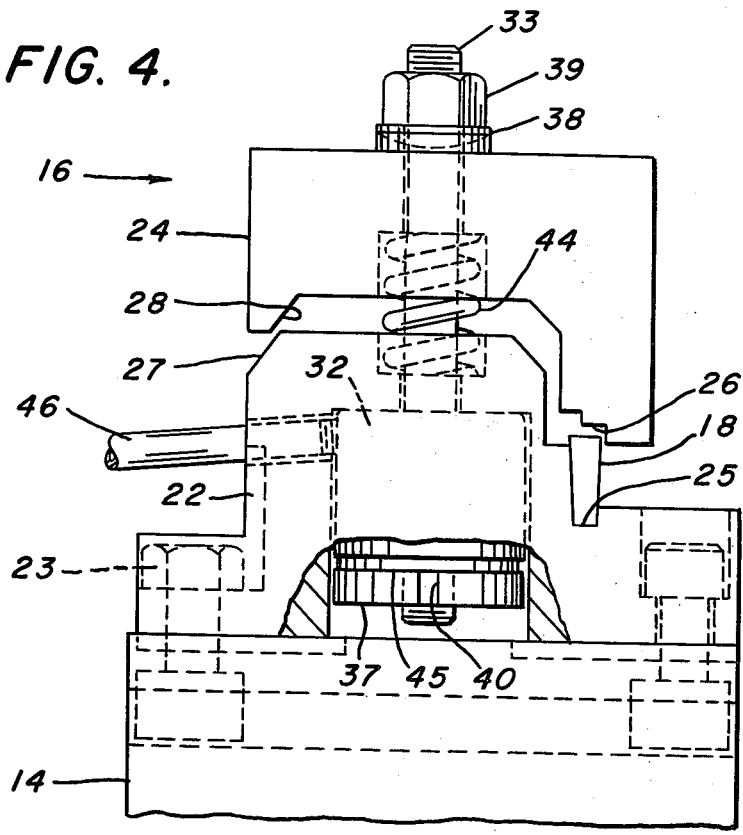

TOOL-CLAMPING DEVICE AND METHOD OF SETTING UP A PIPE CUTOFF MACHINE

This invention relates to an improved hydraulicly operated tool-clamping device, and to an improved method of setting up a pipe cutoff machine.

Although my invention is not thus limited, the device is particularly useful for clamping the parting tools of a pipe cutoff machine used for cropping the ends of pipe before finishing. A conventional pipe cutoff machine includes a pair of cross slides, each of which carries a respective tool-supporting block. Parting tools supported on the blocks engage the pipe at diametrically opposed locations. The pipe rotates while the slides automatically feed toward each other at the same rate while the tools effect a cut. Not only must the tools be held firmly in the blocks, but since the two slides are interlocked, the tools must be positioned precisely equidistant from the centerline of the machine to insure uniform chip loading and maximum tool life. Conventional practice in setting up the cutoff machine has been to insert the tools manually in wedge-type slots in the blocks and to clamp them with two ¾ inch diameter bolts. Proper positioning of the tools is achieved by first roughly positioning them, making a cut and observing chip formation, and then adjusting the tool position to gain an even chip loading. This procedure is both time-consuming and limiting to production.

The present invention makes use of a hydraulically operated device for clamping tools to their supporting blocks. I am aware that hydraulic tool-clamping devices are known, as shown for example in Fildes U.S. Pat. No. 808,647, Drantz U.S. Pat. No. 3,130,618, Vigor et al Patent No. 3,603,186 or Slavinski et al U.S. Pat. No. 3,901,108. These patents represent the closest prior art to the present invention known to me, but as will be apparent my invention is clearly distinguished therefrom.

An object of my invention is to provide an improved hydraulically operated tool-clamping device which is particularly useful for pipe cutoff machines and overcomes the difficulties encountered in the previous practice.

A further object is to provide an improved tool-clamping device which enables a tool to be clamped lightly, moved into contact with a pipe or other workpiece for precise adjustment, and clamped firmly for cutting the workpiece.

A further object is to provide an improved method of setting up a pipe cutoff machine in which tools are lightly clamped in the tool-clamping device of the machine, the tools are moved into contact with a pipe chucked in the machine to position them accurately, and the tools are backed off and clamped firmly for cutting the pipe.

In the drawings:

FIG. 3 is a side elevational view, with parts broken away, of the tool-clamping device with parts in their tool-clamping position;

FIG. 4 is a view similar to FIG. 3, but showing the parts in their tool-releasing position.

Figure 1:
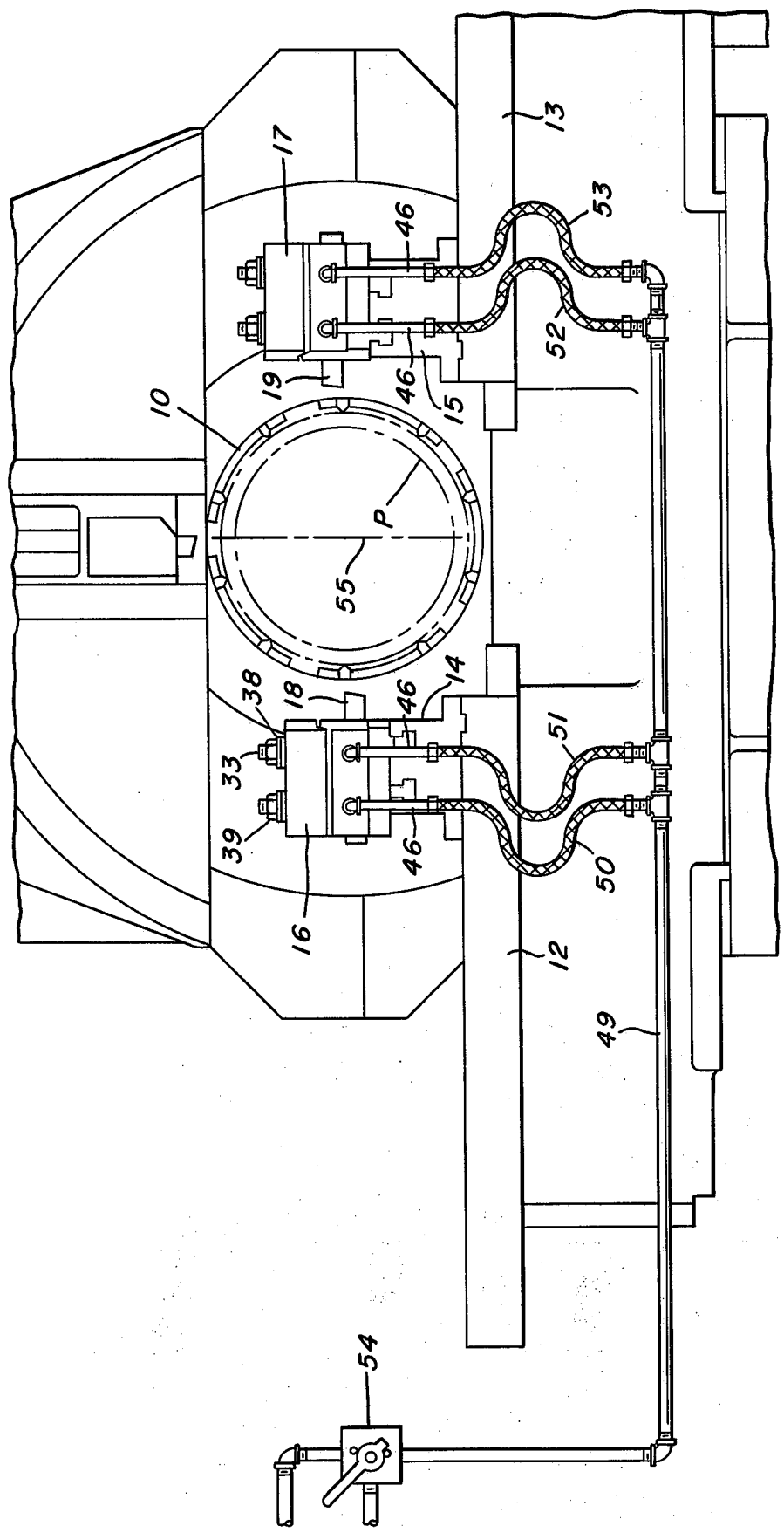
FIG. 1 is a front elevational view of a pipe cutoff machine equipped with tool-clamping devices in accordance with my invention.

FIG. 1 shows a pipe cutoff machine which is conventional apart from the novel tool clamping device. The machine includes a power driven chuck 10 which is rotatable counterclockwise and supports a pipe P for cutting. The machine has an opposed pair of cross slides 12 and 13 and respective tool-supporting blocks 14 and 15 mounted on the slides. Respective tool-clamping devices 16 and 17, which are constructed in accordance with the present invention and hereinafter described, are mounted on the blocks. Parting tools 18 and 19 are clamped in the clamping devices for engaging and cutting the pipe as it rotates. As known in the art, the cutoff machine includes mechanism (not shown) for feeding the two cross slides toward each other as the tools cut the pipe. The slides are interlocked, whereby they always travel at the same rate and through equal distances, but in opposite directions.

Figure 2:
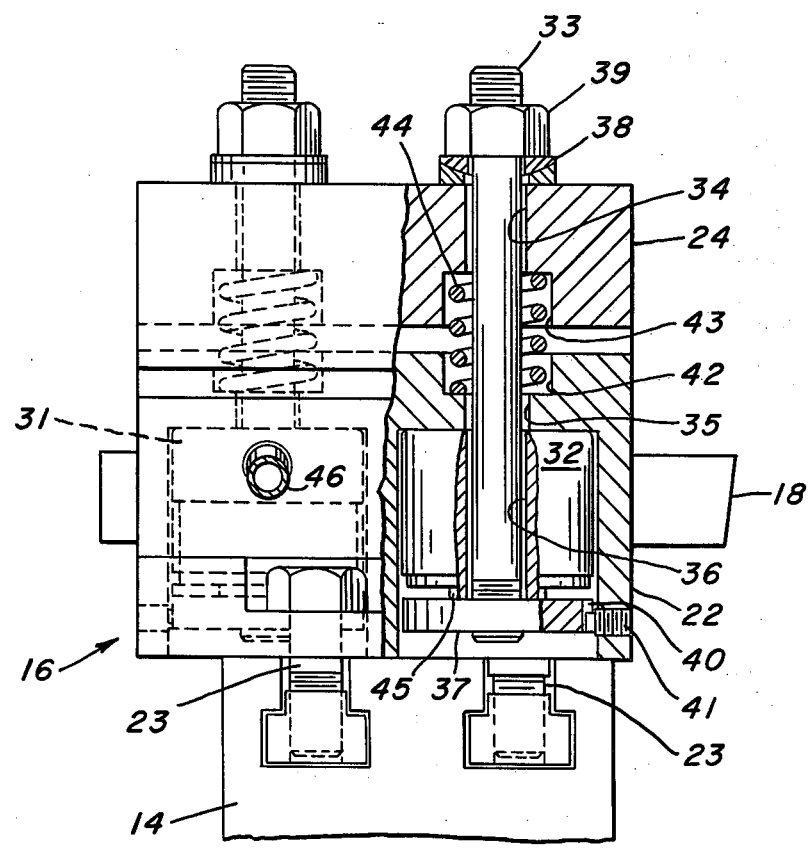
FIG. 2 is a front elevational view of the tool-clamping device on a larger scale and with parts broken away.

The two clamping devices 16 and 17 are of similar construction; hence only one is described in detail. As shown in FIGS. 2, 3 and 4, the clamping device 16 includes a hollow base 22 affixed to the block 14 with bolts 23. A cap 24 overlies the the base 22 for movement between a tool-clamping position shown in FIG. 3 and a tool-releasing position shown in FIG. 4. The upper face of the base has an upwardly open tool-receiving notch 25 in which the tool 18 is seated. The under face of the cap has cooperating downwardly facing step 26 engageable with the tool seated in the notch for clamping it therein. The base and cap have slidably abutting inclined thrust surfaces 27 and 28 which act to pull the cap sideways to the left, as viewed in FIGS. 3 and 4, to provide a wedge action when the cap is pulled downwardly by the hydraulic mechanism hereinafter described. Thus the step 26 of the cap can engage the side and upper surface of the tool lightly to permit the position of the tool to be adjusted easily, or it can engage these surfaces of the tool firmly to hold it fixed for cutting.

As shown in FIG. 2, the hydraulic mechanism for clamping or releasing the tool includes a pair of single-acting hydraulic cylinders 31 and 32 housed within the hollow base 22. The parts associated with the two cylinders are similar; hence only one is described in detail. A stud 33 extends through bores 34, 35 and 36 in the cap 24, base 22 and cylinder 32 respectively to attach the cap to the base. I fix a retainer plate 37 to the lower end of the stud beneath the cylinder. The upper end of the stud carries a set of spherical washers 38 and a nut 39. The edge of the retainer plate has a notch 40 which receives a set screw 41 for preventing rotation of the plate and stud. The base 22 and cap 24 have aligned counterbores 42 and 43 in which I insert a compression spring 44. The spring urges the cap 24 upwardly to the tool-releasing position shown in FIG. 4. Cylinder 32 has an annular piston 45 which projects from its lower end and abuts the retainer plate 37. The cylinder has an inlet pipe 46 connected near its upper end for supplying hydraulic fluid to pull the piston 45, stud 33, and cap 24 downwardly against the action of spring 44 to the tool-clamping position shown in FIG. 3. The spherical washers 38 afford the flexibility needed to enable the cylinders to pull the cap sideways for the wedging action hereinbefore described.

FIG. 1 shows the piping for supplying hydraulic fluid to the pipes 46 of the four cylinders. The piping includes a header 49 and four flexible lines 50, 51, 52 and 53 connected to the header and to the respective pipes 46. The header contains an adjustable valve 54 and extends from a suitable source of hydraulic fluid under pressure (not shown). By selective adjustment of the valve, the tool clamping devices can be set to clamp the tools lightly to permit adjustment or firmly to cut the pipe P.

According to the method of setting up a pipe cutoff machine afforded by the present invention, I insert tools 18 and 19 in notches 25 of the respective tool-clamping devices 16 and 17. The overhang of the tools when first inserted is somewhat greater than the overhang desired during the cutting operation. I operate valve 54 to admit hydraulic fluid under relatively low pressure to the cylinders 31 and 32 to pull the caps 24 into light clamping engagement with the tools seated in the notches. Next I advance the cross slides 12 and 13 until the tools abut a pipe P held in the chunk 10. The pipe may be rotating or not rotating, depending on operator preference. Both lightly clamped tools thus are pushed back relative to the clamping devices 16 and 17 to positions in which the cutting edge of the tools are equidistant from the centerline 55 of the cutoff machine. Next I back the cross slides away from the pipe and operate valve 54 to increase the pressure on the tools to hold them firmly in their adjusted positions. Thus the cutoff machine is set up for cutting.

From the foregoing description it is seen that my invention affords a tool-clamping device of simple construction and a method which greatly facilitate setting up a pipe cutoff machine with tools accurately positioned for cutting. In an actual installation in a plant of my assignee, my invention has reduced the time required to adjust the tools by at least half. The saving is very significant when it is considered that 135,000 tools were used in a recent year, requiring over 2 minutes per set up under conventional practice.

I claim:

1. A tool-clamping device comprising a base, a cooperating cap, means attaching said cap to said base with said cap overlying said base, one of said base and cap having a tool-receiving notch and the other having cooperating surfaces for abutting two surfaces of a parting tool received in said notch, spring means urging said cap away from said base to a tool-releasing position, and hydraulic means for pulling said cap toward said base to a tool-clamping position against the action of said spring means, said base and said cap having slidably abutting inclined thrust surfaces to provide a wedge action for clamping said tool.

2. A clamping device as defined in claim 1 in which said base is hollow and said hydraulic means includes at least one cylinder housed within said base, and said attaching means includes a stud extending through said cylinder.

3. A clamping device as defined in claim 2 in which said notch is in said base and in which said cap has a step for engaging two surfaces of a tool, and further spherical washers carried by said stud for affording flexibility to enable said cap to move sideways along said thrust surfaces.

4. In a pipe cutoff machine which includes a chuck for holding and rotating a pipe, a pair of cross slides on opposite sides of said chuck interlocked to move together in opposite directions toward or away from diametrically opposite locations on the pipe, a pair of tool-clamping devices, means supporting said clamping devices on the respective cross slides, and respective parting tools clamped in said clamping devices in positions to engage and cut the pipe, the improvement in which each of said clamping devices comprises a base, a cooperating cap, said tool being clamped between said base and said cap, spring means urging said base and said cap apart to a tool-releasing position, and hydraulic means pulling said base and said cap together against the action of said spring means to a tool-clamping position.

5. An improvement as defined in claim 4 in which each of said clamping devices further comprises means attaching said cap to said base with said cap overlying said base, said base having a tool-receiving notch, said cap having cooperating surfaces abutting two surfaces of the tool received in said notch, said base and said cap having slidably abutting inclined thrust surfaces providing a wedge action clamping said tool.

6. An improvement as defined in claim 5 in which said base is hollow and said hydraulic means includes at least one cylinder housed within said base, and said attaching means includes a stud extending through said cylinder.

7. An improvement as defined in claim 6 in which each of said clamping devices further comprises spherical washers carried by said stud for affording flexibility to enable said cap to move sideways along said thrust surfaces.

* * * * *

UNITED STATES PATENT OFFICE
CERTIFICATE OF CORRECTION

Patent No. 4,082,020　　　　　　　　　Dated April 4, 1978

Inventor(s) Merl R. Stein

It is certified that error appears in the above-identified patent and that said Letters Patent are hereby corrected as shown below:

Column 3, line 13, "chunk" should read --chuck--.
　　　　(in application, page 5, line 26)

Claim 3, line 8, after "further" insert --comprising--,
　　　　(in application, page 7, line 19)

Signed and Sealed this

Nineteenth Day of September 1978

[SEAL]

Attest:

RUTH C. MASON
Attesting Officer

DONALD W. BANNER
Commissioner of Patents and Trademarks